US012683169B2

(12) United States Patent
Sakamoto et al.

(10) Patent No.: US 12,683,169 B2
(45) Date of Patent: Jul. 14, 2026

(54) NEGATIVE ELECTRODE FOR SECONDARY BATTERIES, AND SECONDARY BATTERY

(71) Applicant: PANASONIC INTELLECTUAL PROPERTY MANAGEMENT CO., LTD., Osaka (JP)

(72) Inventors: Kyohei Sakamoto, Osaka (JP); Nobuhiko Hojo, Osaka (JP); Masaki Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 746 days.

(21) Appl. No.: 17/912,970

(22) PCT Filed: Jan. 26, 2021

(86) PCT No.: PCT/JP2021/002529
§ 371 (c)(1),
(2) Date: Sep. 20, 2022

(87) PCT Pub. No.: WO2021/192575
PCT Pub. Date: Sep. 30, 2021

(65) Prior Publication Data
US 2023/0109890 A1 Apr. 13, 2023

(30) Foreign Application Priority Data
Mar. 26, 2020 (JP) ................................. 2020-055443

(51) Int. Cl.
H01M 4/62 (2006.01)
H01M 4/02 (2006.01)
(Continued)

(52) U.S. Cl.
CPC ........... H01M 4/625 (2013.01); H01M 4/134 (2013.01); H01M 4/1395 (2013.01);
(Continued)

(58) Field of Classification Search
CPC .... H01M 4/625; H01M 4/134; H01M 4/1395; H01M 4/364; H01M 4/366; H01M 4/38;
(Continued)

(56) References Cited

U.S. PATENT DOCUMENTS 5,395,711 A * 3/1995 Tahara .................. H01M 10/05
429/231.95
5,705,291 A * 1/1998 Amatucci ............. H01M 4/505
29/623.5
(Continued)

FOREIGN PATENT DOCUMENTS

CN 102931413 A 2/2013
CN 110521029 A 11/2019
(Continued)

OTHER PUBLICATIONS

English Transaltion of International Search Report dated Apr. 20, 2021, issued in counterpart Application No. PCT/JP2021/002529. (3 pages).
(Continued)

*Primary Examiner* — Barbara L Gilliam
*Assistant Examiner* — Lawrence La Raia, III
(74) *Attorney, Agent, or Firm* — WHDA, LLP

(57) ABSTRACT

This negative electrode for secondary batteries is provided with a negative electrode mixture that contains a negative electrode active material, an additive and a conductive agent. The negative electrode active material contains an Si-containing material; the additive contains an alkali metal sulfate salt; and the conductive agent contains carbon nanotubes. The content of the alkali metal sulfate salt in the negative electrode mixture is from 0.0025% by mass to 0.1% by mass relative to the total mass of the negative electrode active material.

11 Claims, 1 Drawing Sheet

(51) Int. Cl.

| | |
|---|---|
| *H01M 4/134* | (2010.01) |
| *H01M 4/1395* | (2010.01) |
| *H01M 4/36* | (2006.01) |
| *H01M 4/38* | (2006.01) |
| *H01M 4/485* | (2010.01) |
| *H01M 4/58* | (2010.01) |
| *H01M 10/052* | (2010.01) |
| *H01M 10/0525* | (2010.01) |
| *H01M 10/0566* | (2010.01) |

(52) U.S. Cl.

CPC ........... *H01M 4/364* (2013.01); *H01M 4/366* (2013.01); *H01M 4/38* (2013.01); *H01M 4/386* (2013.01); *H01M 4/485* (2013.01); *H01M 4/5825* (2013.01); *H01M 4/62* (2013.01); *H01M 4/626* (2013.01); *H01M 10/052* (2013.01); *H01M 10/0525* (2013.01); *H01M 10/0566* (2013.01); *H01M 2004/021* (2013.01); *H01M 2004/027* (2013.01); *Y02E 60/10* (2013.01)

(58) Field of Classification Search

CPC .... H01M 4/386; H01M 4/485; H01M 4/5825; H01M 4/62; H01M 4/626

See application file for complete search history.

(56) References Cited

U.S. PATENT DOCUMENTS

| | | | | |
|---|---|---|---|---|
| 2009/0029252 | A1 | 1/2009 | Nakai et al. | |
| 2011/0311874 | A1* | 12/2011 | Zhou ..................... | H01M 4/366 |
| | | | | 977/890 |
| 2012/0171571 | A1 | 7/2012 | Kurakane et al. | |
| 2015/0079471 | A1* | 3/2015 | Fang ..................... | H01M 4/525 |
| | | | | 427/126.3 |
| 2019/0229332 | A1 | 7/2019 | Hirose et al. | |
| 2019/0273250 | A1* | 9/2019 | Zhamu ................ | H01M 4/1395 |
| 2020/0035999 | A1 | 1/2020 | Hayashida et al. | |
| 2020/0058941 | A1 | 2/2020 | Hayashi et al. | |
| 2020/0295361 | A1* | 9/2020 | Takami ................. | H01M 4/366 |
| 2020/0303735 | A1* | 9/2020 | Hartmann ................ | C09J 7/403 |
| 2020/0365898 | A1 | 11/2020 | Uchiyama et al. | |
| 2021/0066716 | A1 | 3/2021 | Uchiyama et al. | |
| 2021/0202930 | A1 | 7/2021 | Yamamoto et al. | |

FOREIGN PATENT DOCUMENTS

| | | | |
|---|---|---|---|
| EP | 3093910 | A1 | 11/2016 |
| JP | 2005-310760 | A | 11/2005 |
| JP | 2009-026691 | A | 2/2009 |
| JP | 2011-023342 | A | 2/2011 |
| JP | 2016-110876 | A | 6/2016 |
| JP | 2017-084759 | A | 5/2017 |
| WO | 2012/110931 | A1 | 8/2012 |
| WO | 2015/105167 | A1 | 7/2015 |
| WO | 2018/061536 | A1 | 4/2018 |
| WO | 2018/179970 | A1 | 10/2018 |
| WO | 2019/065766 | A1 | 4/2019 |
| WO | 2019/107032 | A1 | 6/2019 |
| WO | 2019/151026 | A1 | 8/2019 |

OTHER PUBLICATIONS

Office Action dated Feb. 25, 2025, issued in counterpart CN Application No. 202180024713.X, with Partial English translation. (8 pages).

Extended (Supplementary)European Search Report dated Sep. 21, 2023, issued in counterpart EP Application No. 21776398.6. (8 pages).

* cited by examiner

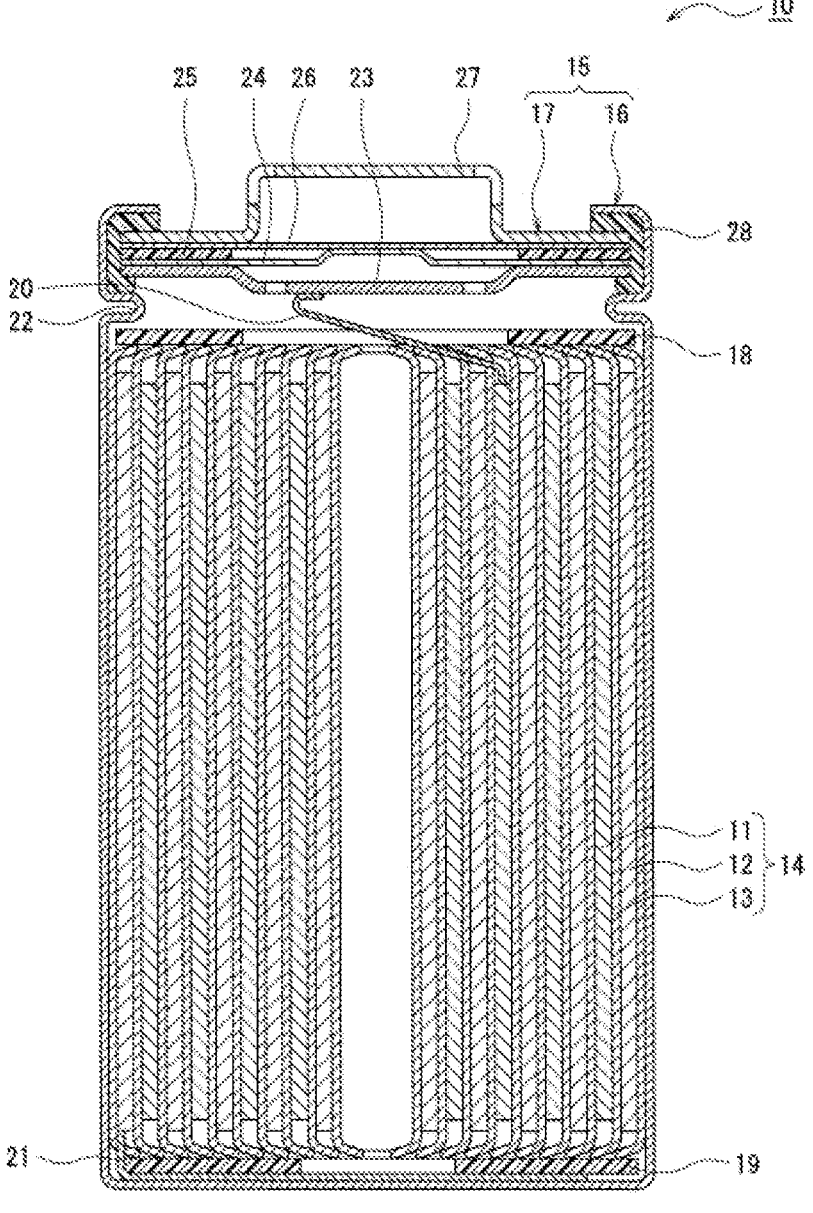

NEGATIVE ELECTRODE FOR SECONDARY BATTERIES, AND SECONDARY BATTERY

CROSS-REFERENCE TO RELATED APPLICATION

This application is a National Phase Application filed under 35 U.S.C. § 371 of International Application No. PCT/JP2021/002529 filed on Jan. 26, 2021, which claims the benefit of priorities under 35 U.S.C. § 119(a) of Japanese Patent Application No. 2020-055443 filed in Japan on Mar. 26, 2020, the contents of which are incorporated herein by reference.

TECHNICAL FIELD

The present disclosure relates to a negative electrode for secondary batteries and to a secondary battery.

BACKGROUND

Si-containing materials are alloying materials that are alloyed with lithium. It is known that a Si-containing material can occlude a larger amount of lithium ions per unit volume than a carbon-based active material such as graphite, and Si-containing materials are expected to be used in a negative electrode active material of a secondary battery.

However, Si-containing materials have a large volume change (expansion/contraction) during charge and discharge, and therefore the conductivity of the negative electrode is likely to decrease, and as a result, there is a problem that the charge-discharge cycle characteristics deteriorate.

For solving such a problem, there is a technique in which a carbon nanotube is added into a negative electrode having a Si-containing material to suppress a decrease in conductivity of the negative electrode due to expansion and contraction of the Si-containing agent and to suppress a decrease in charge-discharge cycle characteristics.

CITATION LIST

Patent Literature

Patent Literature 1: JP 2005-310760 A

SUMMARY

Carbon nanotubes have a large specific surface area, and therefore have a problem of reacting with the electrolyte liquid at the time of initial charge and discharge of the secondary battery to deteriorate the initial charge-discharge efficiency. The initial charge-discharge efficiency refers to a ratio of an initial discharge capacity to an initial charge capacity.

A negative electrode for secondary batteries of an aspect of the present disclosure includes a negative electrode mixture including a negative electrode active material, an additive, and a conductive agent, the negative electrode active material includes an Si-containing material, the additive includes an alkali metal sulfate, and the conductive agent includes a carbon nanotube, and the negative electrode mixture has a content of the alkali metal sulfate of 0.0025 mass % or more and 0.1 mass % or less based on a total amount of the negative electrode active material.

A secondary battery of an aspect of the present disclosure includes the negative electrode for secondary batteries, a positive electrode, and a non-aqueous electrolyte liquid.

According to the present disclosure, it is possible to suppress a decrease in the initial charge-discharge efficiency.

BRIEF DESCRIPTION OF DRAWING

FIG. 1 is a sectional view of a secondary battery of an example of an embodiment.

DESCRIPTION OF EMBODIMENTS

A negative electrode for secondary batteries of an aspect of the present disclosure includes a negative electrode mixture including a negative electrode active material, an additive, and a conductive agent, the negative electrode active material includes an Si-containing material, the additive includes an alkali metal sulfate, and the conductive agent includes a carbon nanotube, and the negative electrode mixture has a content of the alkali metal sulfate of 0.0025 mass % or more and 0.1 mass % or less based on a total amount of the negative electrode active material. According to the present disclosure, it is considered that a decrease in the initial charge-discharge efficiency in the secondary battery is suppressed because the alkali metal sulfate is specifically present in a large amount on the carbon nanotube and has a property of suppressing a reaction between the carbon nanotube and the electrolyte liquid. However, in order to achieve the above effect, the content of the alkali metal sulfate in the negative electrode mixture is to be in the above range. If the content of the alkali metal sulfate is less than 0.0025 mass % based on the total amount of the negative electrode active material, for example, the reaction between the carbon nanotube and the electrolyte liquid cannot be sufficiently suppressed, and thus the effect of suppressing a decrease in the initial charge-discharge efficiency cannot be obtained. If the content of the alkali metal sulfate is more than 0.1 mass % based on the total amount of the negative electrode active material, for example, the alkali metal sulfate is present in a large amount in a portion other than the carbon nanotube, and the influence of a side reaction due to the alkali metal sulfate is increased, and thus the effect of suppressing a decrease in the initial charge-discharge efficiency cannot be obtained.

The carbon nanotube included in the negative electrode mixture follows the expansion and the contraction of the Si-containing material that are caused by charge and discharge, and thus the Si-containing material isolated from the conductive path in the negative electrode mixture is restrained from increasing. Therefore, the carbon nanotube contributes to an effect of suppressing a decrease in the conductivity of the negative electrode due to expansion and contraction of the Si-containing material and suppressing a decrease in the charge-discharge cycle characteristics.

Hereinafter, embodiments of the negative electrode for secondary batteries and the secondary battery according to the present disclosure will be described in detail with reference to the drawing. In the present description, the expression "a numerical value (1) to a numerical value (2)" means the numerical value (1) or more and the numerical value (2) or less.

FIG. 1 is a sectional view of a secondary battery of an example of an embodiment. A secondary battery 10 shown in FIG. 1 includes a wound electrode assembly 14 in which a positive electrode 11 and a negative electrode 12 are wound with a separator 13 interposed therebetween, a non-aqueous electrolyte, insulating plates 18 and 19 disposed on the upper and lower sides of the electrode assembly 14 respectively, and a battery case 15 housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metal cases having a cylindrical shape, a square shape, a coin shape, a button shape, or the like, and resin cases (laminated batteries) formed by lamination with a resin sheet.

The case body 16 is, for example, a bottomed cylindrical metal container. A gasket 28 is provided between the case body 16 and the sealing assembly 17 to ensure the sealability inside the battery. The case body 16 has an inward protrusion 22 in which, for example, a part of the side part of the case body 16 protrudes inward to support the sealing assembly 17. The inward protrusion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are stacked in this order from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and the insulating member 25 is interposed between the circumferential parts of the lower vent member 24 and the upper vent member 26. When the internal pressure of the secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the secondary battery 10 shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the inner surface of the bottom of the case body 16 by welding or the like, and the case body 16 serves as a negative electrode terminal.

Hereinafter, the positive electrode 11, the negative electrode 12, the separator 13, and the non-aqueous electrolyte included in the secondary battery 10 will be described in detail.

[Positive Electrode]

The positive electrode 11 includes, for example, a positive electrode current collector and a positive electrode mixture layer formed on the positive electrode current collector. As the positive electrode current collector, a foil of a metal, such as aluminum or an aluminum alloy, that is stable in a potential range of the positive electrode, a film in which the metal is disposed on its surface layer, or the like can be used. The positive electrode mixture layer includes, for example, a positive electrode mixture including a positive electrode active material, a binder, a conductive agent, and the like. The positive electrode mixture layer is preferably formed on both surfaces of the positive electrode current collector. The positive electrode 11 can be manufactured by, for example, applying a positive electrode mixture slurry including a positive electrode active material, a binder, a conductive agent, and the like to a positive electrode current collector, and drying and rolling the applied film to form a positive electrode mixture layer on both surfaces of the positive electrode current collector.

As the positive electrode active material, for example, a lithium-transition metal composite oxide is used. Examples of the metal element included in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, or Mn is preferably included. Examples of suitable composite oxides include lithium-transition metal composite oxides including Ni, Co, and Mn, and lithium-transition metal composite oxides including Ni, Co, and Al.

Examples of the conductive agent included in the positive electrode mixture layer include carbon materials such as carbon black, acetylene black, Ketjenblack, graphene, carbon nanotubes, and graphite. Examples of the binder included in the positive electrode mixture layer include fluororesins such as polytetrafluoroethylene (PTFE) and polyvinylidene fluoride (PVDF), polyacrylonitrile (PAN), polyimides, acrylic resins, polyolefins, carboxymethylcellulose (CMC) and its salts, and polyethylene oxide (PEO).

[Negative Electrode]

The negative electrode 12 includes, for example, a negative electrode current collector and a negative electrode mixture layer formed on the current collector. As the negative electrode current collector, a foil of a metal, such as copper or a copper alloy, that is stable in a potential range of the negative electrode, a film in which the metal is disposed on its surface layer, or the like can be used. The negative electrode mixture layer includes a negative electrode mixture including a negative electrode active material, an additive, a conductive agent, and the like. The negative electrode mixture suitably includes a binder in addition to the above substances. The negative electrode 12 can be manufactured by, for example, applying a negative electrode mixture slurry including a negative electrode active material, an additive, a conductive agent, a binder, and the like to a negative electrode current collector, and drying and rolling the applied film to form a negative electrode mixture layer on both surfaces of the negative electrode current collector.

The negative electrode active material includes a Si-containing material. The Si-containing material is to be a material that can occlude and release lithium ions, and from the viewpoint of, for example, increasing the capacity of the secondary battery, it is preferable that the Si-containing material include a lithium ion conductive phase and Si particles dispersed in the lithium ion conductive phase, and the lithium ion conductive phase be at least one selected from a silicon oxide phase, a silicate phase, and a carbon phase.

The silicate phase preferably includes, for example, at least one element $E_1$ selected from lithium, sodium, potassium, rubidium, cesium, francium, beryllium, magnesium, calcium, strontium, barium, and radium from the viewpoints of high lithium ion conductivity and the like.

The silicate phase preferably further includes, for example, at least one element E2 selected from zirconium, niobium, tantalum, lanthanum, vanadium, titanium, phosphorus, bismuth, zinc, tin, lead, antimony, cobalt, fluorine, tungsten, aluminum, and boron from the viewpoints of suppressing a decrease in the initial charge-discharge efficiency, and the like.

The Si-containing material preferably has a particle surface on which a conductive film including a material having high conductivity is formed. The constituent material of the conductive film can be exemplified by at least one selected from a carbon material, a metal, and a metal compound. Among them, a carbon material such as amorphous carbon is preferable. The carbon film can be formed with, for example, a CVD method in which acetylene, methane, or the like is used, a method in which coal pitch, petroleum pitch, a phenol resin, or the like is mixed with a silicon-based active material and the mixture is heat-treated, or the like. The conductive film may also be formed by fixing a conductive filler such as carbon black to the particle surface of the Si-containing material using a binding material.

Specific examples of the Si-containing material include a composite material A including a silicate phase and Si particles dispersed in the silicate phase, a composite material B including a silicon oxide phase and Si particles dispersed in the silicon oxide phase, and a composite material C including a carbon phase and Si particles dispersed in the carbon phase. The materials may be used singly or in combination of two or more kinds thereof.

The silicate phase of the composite material A preferably includes the above-described element E1, and more preferably further includes the above-described element E2. Among the silicate phases, a silicate phase including lithium (hereinafter, sometimes referred to as lithium silicate phase) is preferable from the viewpoint of high lithium ion conductivity, the viewpoint of suppressing a decrease in the initial charge-discharge efficiency, and the like. That is, the composite material A preferably includes a lithium silicate phase and Si particles dispersed in the lithium silicate phase (hereinafter, sometimes referred to as LSX).

The composite material A preferably has a content of the silicon particles of 30 mass % or more and 80 mass % or less, preferably 35 mass % or more and 75 mass % or less, and more preferably 55 mass % or more and 70 mass % or less from the viewpoints of increasing the capacity, improving the charge-discharge cycle characteristics, and the like.

The content of the silicon particles can be measured by Si-NMR. Desirable measurement conditions of Si-NMR will be described below.

Measuring device: solid-state nuclear magnetic resonance spectrometer (INOVA-400) manufactured by VARIAN MEDICAL SYSTEMS, INC.

Probe: Varian 7 mm CPMAS-2

MAS: 4.2 kHz

MAS rate: 4 kHz

Pulse: DD (45-degree pulse+signal acquisition time 1H decoupling)

Repetition time: 1200 sec

Observation width: 100 kHz

Observation center: approximately-100 ppm

Signal acquisition time: 0.05 sec

Number of scans: 560

Sample weight: 207.6 mg

The Si particles dispersed in the silicate phase have a particulate phase of Si alone and include a single crystallite or a plurality of crystallites. The Si particles preferably has a crystallite size of, for example, 30 nm or less from the viewpoints of improving the charge-discharge cycle characteristics, and the like. The lower limit of the crystallite size of the Si particles is not particularly limited, and is, for example, 5 nm.

The crystallite size of the Si particles is more preferably 10 nm or more and 30 nm or less, and still more preferably 15 nm or more and 25 nm or less. The crystallite size of the Si particles is calculated with the Scherrer equation from the half width of the diffraction peak attributed to the Si (111) plane in the X-ray diffraction (XRD) pattern of the Si particle.

The Si particles preferably has an average particle diameter of, for example, 500 nm or less, more preferably 200 nm or less, and still more preferably 50 nm or less before the initial charge from the viewpoints of restraining the Si particles themselves from cracking, and the like. After the initial charge, the average particle diameter of the Si particles is preferably 400 nm or less, and more preferably 100 nm or less.

The average particle diameter of the Si particles is measured by observing a sectional SEM (scanning electron microscope) photograph of the composite material A. Specifically, the average particle diameter of the Si particles is determined by averaging the maximum diameters of 100 arbitrary Si particles.

The lithium silicate phase is represented by, for example, the formula: $Li_{2z}SiO_{2+z}$ ($0<z<2$). From the viewpoints of stability, ease of production, lithium ion conductivity, and the like, z preferably satisfies the relation of $0<z<1$, and more preferably $z=\frac{1}{2}$.

The composite material B in which Si particles are dispersed in a silicon oxide phase is represented by, for example, a general formula $SiO_x$ (in which x is preferably in the range of $0<x<2$, and more preferably in the range of $0.5 \leq x \leq 1.6$). The composite material C in which Si particles are dispersed in a carbon phase is represented by, for example, a general formula $Si_xC_y$ (in which x and y are preferably in the ranges of $0<x \leq 1$ and $0<y \leq 1$, and more preferably in the ranges of $0.3 \leq x \leq 0.45$ and $0.7 \leq y \leq 0.55$). The content, the crystallite size, and the average particle diameter of the Si particles in the composite materials B and C may be the same as those in the composite material A.

The content of the Si-containing material in the negative electrode active material is, for example, preferably 1 mass % or more and 15 mass % or less based on the total amount of the negative electrode active material from the viewpoints of increasing the capacity of the secondary battery, suppressing a decrease in the charge-discharge cycle characteristics, and the like.

The negative electrode active material preferably further includes a carbon material that electrochemically occludes and releases lithium ions as another negative electrode material having a smaller degree of expansion and contraction during charge and discharge than the Si-containing material. The content of the carbon material in the negative electrode active material is, for example, preferably 85 mass % or more and 99 mass % or less based on the total amount of the negative electrode active material from the viewpoints of suppressing a decrease in the charge-discharge cycle characteristics of the secondary battery, and the like.

Examples of the carbon material include graphite, graphitizable carbon (soft carbon), and non-graphitizable carbon (hard carbon). Among them, graphite, which has excellent charge-discharge stability and a small irreversible capacity, is preferable. Graphite means a material having a graphitic crystal structure, and examples of graphite include natural graphite, artificial graphite, and graphitized mesophase-carbon particles.

The content of the negative electrode active material in the negative electrode mixture is, for example, preferably 85 mass % or more, more preferably 90 mass % or more, and still more preferably 95 mass % or more based on the total amount of the negative electrode mixture.

Examples of the carbon nanotube included in the negative electrode mixture as a conductive agent include single-walled carbon nanotubes, double-walled carbon nanotubes, and multi-walled carbon nanotubes. The single-walled carbon nanotube (SWCNT) is a carbon nanostructure in which one graphene sheet forms one cylindrical shape, the double-walled carbon nanotube is a carbon nanostructure in which two graphene sheets are concentrically layered to form one cylindrical shape, and the multi-walled carbon nanotube is a carbon nanostructure in which three or more graphene sheets are concentrically layered to form one cylindrical shape. The graphene sheet refers to a layer in which a carbon atom in an sp2 hybrid orbital forming a crystal of graphite is located at an apex of a regular hexagon. The shape of the carbon nanotube is not limited. Examples of the shape include various forms including needle shapes, cylindrical tube shapes, fishbone shapes (fishbone or cup-stacked type), trump shapes (platelets), and coil shapes.

The carbon nanotube preferably has a fiber length of, for example, 500 nm or more and 200 μm or less, and preferably 1 μm or more and 100 μm or less from the viewpoints of suppressing a decrease in the charge-discharge cycle characteristics, and the like. The fiber length of the carbon nanotube can be determined by measuring the lengths of 50 arbitrary carbon nanotubes with a field-emission scanning electron microscope (FE-SEM) and arithmetically averaging the lengths.

The carbon nanotube preferably has an outermost diameter (that is, fiber diameter) of, for example, 0.5 nm or more and 20 nm or less, and more preferably 1 nm or more and 10 nm or less from the viewpoints of suppressing a decrease in the charge-discharge cycle characteristics, and the like. The outermost diameter of the carbon nanotube can be determined by measuring the outer diameters of 50 arbitrary carbon nanotubes with a field-emission scanning electron microscope (FE-SEM) or a transmission electron microscope (TEM) and arithmetically averaging the outer diameters.

The content of the carbon nanotube in the negative electrode mixture is, for example, preferably 0.01 mass % or more and 1.0 mass % or less, and more preferably 0.1 mass % or more and 0.8 mass % or less based on the total amount of the negative electrode active material from the viewpoints of suppressing a decrease in the charge-discharge cycle characteristics, and the like.

The conductive agent included in the negative electrode mixture may include a particulate conductive agent in addition to the carbon nanotube. Examples of the particulate conductive agent include carbon materials such as carbon black, acetylene black, Ketjenblack, and graphite. When used, the particulate conductive agent preferably has a primary particle diameter of 5 nm or more and 100 nm or less, and preferably has an aspect ratio of less than 10.

Examples of the alkali metal sulfate as an additive included in the negative electrode mixture include lithium sulfate, sodium sulfate, potassium sulfate, rubidium sulfate, cesium sulfate, and francium sulfate. Among them, the alkali metal sulfate preferably includes at least one selected from lithium sulfate, sodium sulfate, and potassium sulfate from the viewpoints of further suppressing a decrease in the initial charge-discharge efficiency of the secondary battery, and the like.

The content of the alkali metal sulfate in the negative electrode mixture is to be 0.0025 mass % or more and 0.1 mass % or less, and is preferably 0.01 mass % or more and 0.1 mass % or less, and more preferably 0.02 mass % or more and 0.08 mass % or less based on the total amount of the negative electrode active material from the viewpoint of suppressing a decrease in the initial charge-discharge efficiency of the secondary battery.

The binder included in the negative electrode mixture may be the same as the binder used in the positive electrode 11. The content of the binder in the negative electrode mixture is, for example, preferably 0.5 mass % to 10 mass %, and more preferably 1 mass % to 5 mass % based on the total amount of the negative electrode active material.

[Separator]

As the separator 13, a porous sheet having an ion permeation property and an insulating property is used. Specific examples of the porous sheet include fine porous thin films, woven fabrics, and nonwoven fabrics. As the material of the separator 13, olefin-based resins such as polyethylene, polypropylene, and copolymers containing at least one of ethylene or propylene, cellulose, and the like are suitable. The separator 13 may have a single-layered structure or a multilayered structure. On the surface of the separator 13, a heat-resistant layer or the like may be formed.

[Non-Aqueous Electrolyte]

The non-aqueous electrolyte includes a non-aqueous solvent and an electrolyte salt. The non-aqueous electrolyte is not limited to a liquid electrolyte, and may be a solid electrolyte in which a gel polymer or the like is used. As the electrolyte salt, for example, a lithium salt such as LiFSI, LiTFSI, $LiBF_4$, or $LiPF_6$ is used. As the solvent, for example, an ester such as ethylene carbonate (EC), propylene carbonate (PC), dimethyl carbonate (DMC), ethyl methyl carbonate (EMC), diethyl carbonate (DEC), methyl acetate (MA), or methyl propionate (MP), an ether, a nitrile, an amide, or a mixed solvent of two or more kinds thereof is used. The non-aqueous solvent may contain a halogen-substituted solvent in which at least a part of hydrogen in the solvent described above is substituted with a halogen atom such as fluorine.

Examples of the halogen-substituted solvent include fluorinated cyclic carbonic acid esters such as fluoroethylene carbonate (FEC), fluorinated chain carbonic acid esters, and fluorinated chain carboxylic acid esters such as methyl fluoropropionate (FMP).

EXAMPLES

Hereinafter, the present disclosure will be further described with reference to Examples, but the present disclosure is not limited to these Examples.

Example 1

[Preparation of Si-Containing Material (LSX)]

Silicon dioxide and lithium carbonate were mixed so that the atom ratio Si/Li was 1.05, and the mixture was fired in the air at 950° C. for 10 hours to obtain lithium silicate represented by the formula: $Li_2Si_2O_5$. The obtained lithium silicate was pulverized so as to have an average particle diameter of 10 μm.

The lithium silicate and raw material silicon (average particle diameter: 10 μm) were mixed at a mass ratio of 70:30. This mixture was filled in a pot (made of SUS, volume: 500 mL) of a planetary ball mill (P-5 manufactured by FRITSCH GMBH), 24 SUS balls (diameter: 20 mm) were put in the pot, the lid was closed, and the mixture was pulverized at 200 rpm for 50 hours in an inert atmosphere. Next, the powdery mixture was taken out from the pot and fired at 800° C. for 4 hours in an inert atmosphere under a pressure applied by a hot press machine to obtain a sintered body of the mixture (LSX).

The obtained LSX was pulverized and passed through a 40 μm mesh, then the obtained LSX particles were mixed with coal pitch, and the mixture was fired at 800° C. in an inert atmosphere to coat the surface of the LSX particles with conductive carbon to form a conductive layer. The coating amount of the conductive layer was 5 mass % based on to the total mass of the LSX particles and the conductive layer. Thereafter, LSX particles having a conductive layer and an average particle diameter of 5 μm were obtained using a sieve. The content of $Li_2Si_2O_5$ measured by Si-NMR was 70 mass % (the content of the Si particles was 30 mass %).

[Production of Negative Electrode]

The LSX particles having a conductive layer and graphite were mixed at a mass ratio of 5:95, and this mixture was used as a negative electrode active material. The negative electrode active material, sodium sulfate (an additive), a carbon nanotube (a conductive agent), sodium carboxymethylcellulose, and styrene butadiene rubber were mixed at a mass ratio of 100:0.0025:0.3:1.3:1.0, and an appropriate amount of water was added to adjust a negative electrode mixture slurry.

The negative electrode mixture slurry was applied to both surfaces of a negative electrode current collector formed using a copper foil, the applied film was dried and then rolled using a roller to produce a negative electrode in which a negative electrode mixture layer was formed on both surfaces of the negative electrode current collector.

[Non-Aqueous Electrolyte Liquid]

In a mixed solvent obtained by mixing ethylene carbonate (EC), dimethyl carbonate (DMC), and methyl acetate (MA) at a volume ratio of 20:40:40, $LiPF_6$ was dissolved at a ratio of 1.2 mol/L to prepare a non-aqueous electrolyte liquid.

[Test Cell]

The positive electrode and the negative electrode were stacked so as to face each other with a separator interposed therebetween, and the resulting product was wound to produce an electrode assembly. Next, the electrode assembly and the non-aqueous electrolyte liquid were housed in a bottomed cylindrical battery case body, the electrolyte liquid was injected, and then the opening of the battery case body was sealed with a gasket and a sealing assembly to produce a test cell.

Example 2

A test cell was produced in the same manner as in Example 1 except that the negative electrode active material, sodium sulfate (an additive), a carbon nanotube (a conductive agent), sodium carboxymethylcellulose, and styrene butadiene rubber were mixed at a mass ratio of 100:0.025:0.3:1.3:1.0 in production of the negative electrode.

Example 3

A test cell was produced in the same manner as in Example 1 except that the negative electrode active material, sodium sulfate (an additive), a carbon nanotube (a conductive agent), sodium carboxymethylcellulose, and styrene butadiene rubber were mixed at a mass ratio of 100:0.05:0.3:1.3:1.0 in production of the negative electrode.

Example 4

A test cell was produced in the same manner as in Example 1 except that the negative electrode active material, sodium sulfate (an additive), a carbon nanotube (a conductive agent), sodium carboxymethylcellulose, and styrene butadiene rubber were mixed at a mass ratio of 100:0.1:0.3:1.3:1.0 in production of the negative electrode.

Comparative Example 1

A test cell was produced in the same manner as in Example 1 except that the negative electrode active material, a carbon nanotube (a conductive agent), sodium carboxymethylcellulose, and styrene butadiene rubber were mixed at a mass ratio of 100:0.3:1.3:1.0 without using sodium sulfate as an additive in production of the negative electrode.

Comparative Example 2

A test cell was produced in the same manner as in Example 1 except that the negative electrode active material, sodium sulfate (an additive), a carbon nanotube (a conductive agent), sodium carboxymethylcellulose, and styrene butadiene rubber were mixed at a mass ratio of 100:0.3:0.3:1.3:1.0 in production of the negative electrode.

[Evaluation of Initial Charge-Discharge Efficiency]

The test cell was charged at a constant current of 0.3 C under a temperature environment of 25° C. until the battery voltage reached 4.2 V, and discharged at a constant current of 0.3 C until the battery voltage reached 2.5 V. The initial charge capacity and the initial discharge capacity were measured, and the initial charge-discharge efficiency was determined with the following formula.

Initial charge-discharge efficiency=(initial discharge capacity/initial charge capacity)×100

Table 1 shows the evaluation results of the initial charge-discharge efficiency in Examples and Comparative Examples. However, in the evaluation results in Table 1, the initial charge-discharge efficiency in Comparative Example 1 is used as a reference, and the initial charge-discharge efficiency in other Examples and Comparative Examples is shown as an increase rate with respect to the above reference. A positive increase rate indicates that a decrease in the initial charge-discharge efficiency was suppressed.

TABLE 1

|  | Additive | Content of additive | Conductive agent | Initial charge-discharge efficiency |
|---|---|---|---|---|
| Example 1 | Sodium sulfate | 0.0025 wt | Carbon nanotube | 0.1% |
| Example 2 | Sodium sulfate | 0.025 wt % | Carbon nanotube | 0.2% |

TABLE 1-continued

| | Additive | Content of additive | Conductive agent | Initial charge-discharge efficiency |
|---|---|---|---|---|
| Example 3 | Sodium sulfate | 0.05 wt % | Carbon nanotube | 0.3% |
| Example 4 | Sodium sulfate | 0.10 wt % | Carbon nanotube | 0.1% |
| Comparative Example 1 | None | — | Carbon nanotube | Reference |
| Comparative Example 2 | Sodium sulfate | 0.3 wt % | Carbon nanotube | −0.1% |

In Examples 1 to 4 in which the content of the alkali metal sulfate in the negative electrode mixture was 0.0025 mass % or more and 0.1 mass % or less based on the total amount of the negative electrode active material including the Si-containing material, the initial charge-discharge efficiency showed a value higher than the initial charge-discharge efficiency in Comparative Example 1 in which no alkali metal sulfate was included. That is, it can be said that a decrease in the initial charge-discharge efficiency was suppressed in Examples 1 to 4.

REFERENCE SIGNS LIST

10 Secondary battery
11 Positive electrode
12 Negative electrode
13 Separator
14 Electrode assembly
15 Battery case
16 Case body
17 Sealing assembly
18, 19 Insulating plate
20 Positive electrode lead
21 Negative electrode lead
22 Inward protrusion
23 Filter
24 Lower vent member
25 Insulating member
26 Upper vent member
27 Cap
28 Gasket

The invention claimed is:

1. A negative electrode for secondary batteries, the negative electrode comprising a negative electrode mixture including a negative electrode active material, an additive, and a conductive agent, the negative electrode active material including a carbon material and an Si-containing material, the additive including an alkali metal sulfate, and the conductive agent including a carbon nanotube, the alkali metal sulfate is an inorganic compound, the negative electrode mixture having a content of the alkali metal sulfate of 0.0025 mass % or more and 0.1 mass % or less based on a total amount of the negative electrode active material, and the negative electrode active material having a content of the carbon material of 85 mass % or more and 99 mass % or less".

2. The negative electrode for secondary batteries according to claim 1, wherein the alkali metal sulfate includes at least one selected from sodium sulfate, lithium sulfate, and potassium sulfate.

3. The negative electrode for secondary batteries according to claim 1, wherein the negative electrode mixture has a content of the carbon nanotube of 0.01 mass % or more and 1.0 mass % or less based on the total amount of the negative electrode active material.

4. The negative electrode for secondary batteries according to claim 1, wherein the carbon nanotube has an outermost diameter of 0.5 nm or more and 20 nm or less.

5. The negative electrode for secondary batteries according to claim 1, wherein the carbon nanotube has a fiber length of 500 nm or more and 200 μm or less.

6. The negative electrode for secondary batteries according to claim 1, wherein the Si-containing material includes a lithium ion conductive phase and Si particles dispersed in the lithium ion conductive phase, and the lithium ion conductive phase is at least one selected from a silicon oxide phase, a silicate phase, and a carbon phase.

7. The negative electrode for secondary batteries according to claim 6, wherein the silicate phase includes at least one element E1 selected from lithium, sodium, potassium, rubidium, cesium, francium, beryllium, magnesium, calcium, strontium, barium, and radium.

8. The negative electrode for secondary batteries according to claim 7, wherein the silicate phase includes at least one element E2 selected from zirconium, niobium, tantalum, lanthanum, vanadium, titanium, phosphorus, bismuth, zinc, tin, lead, antimony, cobalt, fluorine, tungsten, aluminum, and boron.

9. The negative electrode for secondary batteries according to claim 1, wherein the alkali metal sulfate is present in a larger amount on the carbon nanotube than on the negative electrode active material.

10. A secondary battery comprising the negative electrode for secondary batteries according to claim 1, a positive electrode, and a non-aqueous electrolyte liquid.

11. The negative electrode for secondary batteries according to claim 1, wherein the inorganic compound serving as the alkali metal sulfate includes at least one selected from lithium sulfate, sodium sulfate, potassium sulfate, rubidium sulfate, cesium sulfate, and francium sulfate.

* * * * *